Patented Feb. 20, 1934

1,948,334

UNITED STATES PATENT OFFICE 1,948,334

ADHESIVE AND METHOD OF PREPARING AND APPLYING THE SAME

John E. Clegg, Brooklyn, N. Y., assignor to The Arabol Manufacturing Company, New York, N. Y., a corporation of New York No Drawing. Application December 4, 1931
Serial No. 579,117

8 Claims. (Cl. 87—17)

The invention relates to a novel adhesive composition, more especially suitable in connection with the uniting of surfaces of moisture-proof cellophane, celluloid, glassine, etc., as well as the gluing of these to paper and wax paper surfaces; also, to a novel method of preparing the composition and of effecting therewith the uniting of the aforesaid moisture-proof cellophane, etc., to similar and other materials.

It has for an object to provide a water-free adhesive, normally solid in the cold state, and which will be suitable for uniting surfaces of moisture-proof cellophane to each other or to surfaces of other materials.

A further object of the invention resides in the provision of an adhesive of this nature which may be readily liquefied at elevated temperatures and which will solidify or set at ordinary temperatures.

A still further object of the invention resides in the provision of an adhesive of this nature which will provide a clear transparent, colorless film effecting the adhesion between the surfaces.

It is well known that moisture-proof cellophane is of a non-porous and water-resistant nature and adhesives containing water are thus generally not suitable for effecting adhesion of cellophane to cellophane or to other materials since the water cannot be evaporated from the adhesive except along the outer edges. Furthermore, most volatile solvents do not penetrate moisture-proof cellophane, so that the same objection applies to adhesives utilizing such solvents. Also, solvents which do penetrate moisture-proof cellophane when used in an adhesive tend to carry the adhesive through the material to the outer surface, affording an objectionable sticky coating thereover. Adhesives provided with such solvents, moreover, also tend to destroy the moisture-resistant surfaces of the cellophane.

In accordance with the present invention, an adhesive suitable for the purpose of uniting cellophane surfaces to each other or to other materials is provided free of water, the said adhesive being a solid at ordinary temperatures but melting at approximately 50° C. and is liquefied at approximately 75° C., and flows freely at 100° C. Thus, the adhesive may be caused to assume the desired body adaptable to the various uses for which it is intended by merely adjusting the degree of heat, for example, of the gum box for retaining the same as utilized in various adhesive-applying machines. Upon again cooling, solidification sets in at ordinary temperatures so that the adhesive may readily be applied in the liquefied state by first heating the same and then allowing it to chill to effect the union of the cellophane with the material to which it is desired to have the same adhere.

In preparing this novel composition, a solid, non-drying, amorphous resin is heated to approximately 120° C. to liquefy the same, whereupon there is added thereto a liquid non-drying amorphous resin. The mixture is then allowed to cool and solidify. Or, it may be cooled to approximately 100° C. and a suitable plasticizer added thereto before permitting it to assume the solid state. Such plasticizer may consist of a hydrocarbon solvent having a high boiling point and capable of attacking but slightly the surface of the moisture-proof cellophane to which the adhesive is to be applied. A nitro-cellulose solvent or other penetrating agent, such as diethylene glycol monoethyl ether, is particularly suitable for the purpose, the greater the penetration desired the larger the quantity of this agent utilized. If merely a surface adhesion is desired, no solvent or penetrating agent is required.

Other agents of this nature such as ethylene glycol monobutyl ether, ethylene glycol monoethyl ether, ethylene glycol monomethyl ether, and diethylene glycol monobutyl ether, will also serve satisfactorily as penetrating agents and may be substituted for the aforesaid diethylene glycol monoethyl ether.

In preparing the adhesive, a solid non-drying, amorphous resin is mixed with an amorphous non-drying liquid resin in suitable proportions and, if desired, the penetrating agent is then mixed therewith. For some work a greater proportion of the solid resin is used and correspondingly less of the liquid resin and the amount of the penetrating agent, when utilized, can vary over a considerable range depending on the penetration desired and also on the required rapidity of setting of the adhesive after application. Where a large proportion of the penetrating agent is utilized, say up to 20% of the weight of the solid and liquid resin mixture, the setting may require as long a period as several days. However, I have found that a very satisfactory composition is attained by mixing a solid resin such as G rosin with Venetian turpentine in proportions of from 70—29 parts by weight of the former to 29—70 parts by weight of the latter and adding thereto 1 part of diethylene glycol monobutyl ether. The rosin is used to give body to the adhesive, and the quantity utilized varies with the melting point, all grades of rosin such as D, E, F, G, H, WW, and wood being suitable as well also as the so-called varnish gums, such as shellac, copal, kauri. With respect to the liquid resin, it is preferred to utilize Venetian turpentine, either the true or artificial variety, this ingredient giving flexibility and strength to the adhesive.

Specifically, I have found the following compositions, by weight, to afford a very satisfactory adhesive for the purposes set forth:

I.  49½ parts G rosin
    49½ parts true Venetian turpentine
     1   part diethylene glycol monoethyl ether
    ─────
    100

II. 70 parts G rosin
    29 parts true Venetian turpentine
     1 part diethylene glycol monoethyl ether
    ───
    100

III. 57½ parts G rosin
     37½ parts true Venetian turpentine
      5  parts diethylene glycol monoethyl ether
     ─────
     100

IV. 60¼ parts G rosin
    39¼ parts true Venetian turpentine
     ½ part diethylene glycol monoethyl ether
    ─────
    100

V.  60 parts W. W. rosin
    40 parts artificial Venetian turpentine
    ───
    100

To the latter composition may be added an appreciable percentage of the penetrating agent, say up to 20%, for the purpose of rendering it particularly liquid, but it will be understood that its setting time is thereby materially increased. If a simple surface adhesion is desired, it will be understood that no solvent is required.

I claim:

1. An adhesive composition solid in the cold state, and comprising G rosin, Venetian turpentine, and a glycol ether of the group comprising ethylene glycol monobutyl ether, diethylene glycol monobutyl ether, ethylene glycol monoethyl ether, and ethylene glycol monomethyl ether.

2. An adhesive composition comprising by weight from 70 to 29 parts of G rosin, 29 to 70 parts Venetian turpentine, and 1 to 20% of diethylene glycol monobutyl ether.

3. An adhesive composition comprising by weight 60 parts of G rosin, 39 parts Venetian turpentine, and from 1 to 20% of diethylene glycol monobuytl ether.

4. The method of preparing a composition for causing moisture-proof cellophane to adhere to similar or other materials, which comprises heating solid rosin to approximately 120° C. to liquefy the same, adding thereto Venetian turpentine, cooling the mixture to approximately 100° C., and then adding thereto a glycol ether of the group comprising ethylene glycol monobutyl ether, diethylene glycol monobutyl ether, ethylene glycol monoethyl ether, and ethylene glycol monomethyl ether.

5. The method of preparing a composition for causing moisture-proof cellophane to adhere to similar or other materials, which comprises heating solid rosin to approximately 120° C. to liquefy the same, adding thereto Venetian turpentine, cooling the mixture to approximately 100° C., and adding thereto diethylene glycol monobutyl ether.

6. An adhesive composition, comprising rosin, Venetian turpentine, and a glycol ether of the group comprising ethylene glycol monobutyl ether, diethylene glycol monobutyl ether, ethylene glycol monoethyl ether, and ethylene glycol monomethyl ether.

7. An adhesive composition, comprising rosin, Venetian turpentine, and diethylene glycol monobutyl ether.

8. An adhesive composition solid in the cold state and comprising rosin and Venetian turpentine liquefiable at elevated temperatures, and a small percentage of a glycol ether of the group comprising ethylene glycol monobutyl ether, diethylene glycol monobutyl ether, ethylene glycol monoethyl ether, and ethylene glycol monomethyl ether.

JOHN E. CLEGG.